US007191159B2

(12) United States Patent
Horvitz (10) Patent No.: US 7,191,159 B2
(45) Date of Patent: *Mar. 13, 2007

(54) TRANSMITTING INFORMATION GIVEN CONSTRAINED RESOURCES

(75) Inventor: Eric Horvitz, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/875,867

(22) Filed: Jun. 24, 2004

(65) Prior Publication Data

US 2004/0236719 A1   Nov. 25, 2004

Related U.S. Application Data

(63) Continuation of application No. 09/565,584, filed on May 4, 2000.

(51) Int. Cl.
   *G06N 5/00*   (2006.01)
(52) U.S. Cl. .............................. 706/1; 706/45
(58) Field of Classification Search ............ 706/1, 706/45; 380/37; 713/153; 717/106
   See application file for complete search history.

(56) References Cited

U.S. PATENT DOCUMENTS

| 5,493,692 | A |   | 2/1996  | Theimer et al. |
|-----------|---|---|---------|----------------|
| 5,544,321 | A |   | 8/1996  | Theimer et al. |
| 5,555,376 | A |   | 9/1996  | Theimer et al. |
| 5,603,054 | A |   | 2/1997  | Theimer et al. |
| 5,611,050 | A |   | 3/1997  | Theimer et al. |
| 5,812,865 | A |   | 9/1998  | Theimer et al. |
| 5,838,663 | A |   | 11/1998 | Elwalid et al. |
| 5,864,848 | A |   | 1/1999  | Horvitz et al. |
| 6,021,403 | A |   | 2/2000  | Horvitz et al. |
| 6,145,120 | A | * | 11/2000 | Highland ............ 717/106 |
| 6,161,130 | A |   | 12/2000 | Horvitz et al. |
| 6,266,322 | B1 |  | 7/2001  | Berger et al. |
| 6,453,073 | B2 |  | 9/2002  | Johnson |
| 6,466,232 | B1 |  | 10/2002 | Newell et al. |
| 6,513,026 | B1 |  | 1/2003  | Horvitz et al. |
| 6,513,046 | B1 |  | 1/2003  | Abbott, III et al. |
| 6,549,915 | B2 |  | 4/2003  | Abbott, III et al. |
| 6,747,675 | B1 |  | 6/2004  | Abbott et al. |

(Continued)

FOREIGN PATENT DOCUMENTS

| EP | 9800787  | 1/1998 |
|----|----------|--------|
| EP | 0833492  | 4/1998 |
| EP | 0.924921 | 6/1999 |

OTHER PUBLICATIONS

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

(Continued)

*Primary Examiner*—Wilbert L. Starks, Jr.
(74) *Attorney, Agent, or Firm*—Amin & Turocy, LLP (57) ABSTRACT

Prioritizing text such as e-mail messages, given constrained resources, is disclosed. In one embodiment, a method first receives a plurality of messages, such as e-mail messages. The method prioritizes the messages, based on a predetermined criteria given a constrained resource. The method then outputs the messages to a user, as prioritized given the constrained resource. Specific constrained resources include limited bandwidth, limited storage space, and limited time in which to receive the texts. Embodiments include policies that include priority-sensitive truncation and summarization. Furthermore, in one embodiment, if context is detected, the priorities for caching are affected. In another embodiment, the likelihood that a user already knows all or part of the information being transmitted is considered.

41 Claims, 5 Drawing Sheets

U.S. PATENT DOCUMENTS

| | | | |
|---|---|---|---|
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 6,938,024 B1* | 8/2005 | Horvitz | 706/45 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0196935 A1* | 12/2002 | Wenocur et al. | 380/37 |
| 2002/0199096 A1* | 12/2002 | Wenocur et al. | 713/153 |
| 2003/0046401 A1 | 3/2003 | Abbott et al. | |
| 2003/0154476 A1 | 8/2003 | Abbott, III et al. | |
| 2005/0034078 A1 | 2/2005 | Abbott et al. | |

OTHER PUBLICATIONS

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, pp. 94-104, vol. 265—No. 3.

U.S. Appl. No. 09/055,477, filed Apr. 6, 1998, Methods and . . . .

U.S. Appl. No. 09/007,894, filed Jan. 15, 1998, A Technique for . . . .

Breese, et al., Empirical Analysis of Predictive Algorithms for Collaborative Filtering, 14th Conf on Uncertainty in AI, 1998, pp. 43-52, AUAI, Morgan Kaufmanm, San Francisco.

Czerwinski, et al., Visualizing Implicit Queries for Information Management and Retrieval, CHI '99, ACM SIGCHI Conf on Human Factors in Computing Systems, 1999, pp. 560-567. ACM. Pittsburgh. PA.

Dumais, et al., Inductive Learning Algortihms and Representations for Text Categorizations, 7th Int'l Conf on Information and Knowledge Management, 1998, pp. 148-155, ACM.

Horvitz, Principles of Mixed-Initiative User Interfaces, CHI '99, ACM SIGCHI Conf on Human Factors in Computing Systems, 1999, pp. 159-166, ACM.

Horvitz, et al., Display of Information for Time-Critical Decision Making, 11th Conf on Uncertainty in AI, 1995, pp. 296-305, Montreal, Canada.

Horvitz, et al., The Lumiere Project, 14th Conf on Uncertainty in AI, 1998, pp. 256-265.

Horvitz, et al., Time Dependent Utility and Action Under Uncertainty, 7th Conf on Uncertainty in AI, 1991, pp. 151-158, Los Angeles, CA.

Horvitz, et al., Time-Critical Action: Representations and Application, 13th Conf on Uncertainty in AI, 1997, pp. 25-257, Providence, RI.

Koller, et al., Toward Optimal Feature Selection, 13th Conf on Machine Learning, 1996, pp. 284-292.

Leiberman, An Agent That Assists Web Browsing, IJCAI-95, 1995, Montreal, Canada.

Platt, Fast Training of Support Vector Machines Using Sequential Minimal Optimization, In Advances in Kernal Methods: Support Vector Learning, 1999, MIT Press, Cambridge, MA.

Platt, Probabilistic Outputs for Support Vector Machines and Comparison to Regularized Likelihood Methods, In Advances in Large Margin Classifiers, 1999, MIT Press, Cambridge, MA.

M. Sahami, et al., A Bayesian Approach to Filtering Junk E-mail, In Workshop on Learning for Text Categorization, AAAI Technical Report WS-98-05, 1998, AAAI.

International Search Report from PCT/US01/14137.

Imed Zitouni, et al., Natural Language Call Routing: Towards Combination and Boosting of Classifiers, ASRU '01, 2001, pp. 202-205.

Tammo Spalink, et al., Building a Robust Software-Based Router Using Network Processors, 18th ACM Symposium on Operating Systems Principles, ACM SIGOPS Operating Systems Review, Oct. 2000.

* cited by examiner

TRANSMITTING INFORMATION GIVEN CONSTRAINED RESOURCES

CROSS REFERENCE TO RELATED APPLICATIONS

This application is a continuation application of U.S. patent application Ser. No. 09/565,584, filed May 4, 2000, entitled TRANSMITTING INFORMATION GIVEN CONSTRAINED RESOURCES. The entirety of this application is incorporated herein by reference.

FIELD OF THE INVENTION

This invention relates generally to the transmitting of information represented including text, images, and software components given constrained resources, including the case of extremely limited or expensive bandwidth and/or the situation of having intermittent connectivity of a client device to a network server as may be the case in a mobile situation.

BACKGROUND OF THE INVENTION

Computer users today frequently use their computers and computerized devices, such as handheld computers and cell phones, in a mobile manner. For example, in the past a computer user may have expected only to read his or her e-mail while at a main desktop computer at the office, where this main computer was constantly connected to the company network, and the Internet. However, users are now frequently connecting to network or communication facilities intermittently, from a variety of different locations and using a variety of different devices. For example, a user who travels frequently may connect his or her laptop to the office network while at the airport over a dial-up phone connection just before boarding the plane, or call the up the office network after checking into a hotel. A user may also have his or her e-mail forwarded to a pager, or a cellular phone, or to other forms of wireless network technology. These sorts of connections may be brief, to download some e-mail or other information, before disconnecting. Intermittency may also result even with optimally permanent connections. For example, more sophisticated mobile communications systems may allow for "always-on" wireless services, but in reality signal strength may not be sufficient in all the places users travel, such that the resulting connection is intermittent. Additionally, a system may be designed to limit its usage of bandwidth by only establishing connections and/or transmitting information intermittently.

Intermittent connections and even some permanent connections present difficulties in receiving important e-mail messages and other information, because of the constrained resources that frequently are inherent with such connections. For example, a cellular phone or a pager to which e-mail is being forwarded may only be able to receive a certain number of messages, such that each is of a certain length. As another example, a user in an airport who wishes to connect to his or her desktop or e-mail system over a public phone generally is limited to a relatively slow modem connection, and may not have much time to receive e-mail messages if the user is awaiting a connecting flight. For both of these cases, the user is likely to want to receive only or at least first the most important messages, and perhaps not receive attachments to the e-mail messages, junk mail messages, etc. However, this is not provided for by the prior art. For these and other reasons, there is a need for the present invention.

SUMMARY OF THE INVENTION

The invention relates to prioritizing of information such as instant messages, e-mail messages, or relevant web pages given constrained resources. The invention relates to any type of information, referred to generally herein as texts, such as e-mail messages, software components, graphical information, etc. However, embodiments of the invention are described by example as relating to e-mail, although it is understood that the invention itself is not so limited. In one embodiment, a method first receives a plurality of texts, such as e-mail messages. The method prioritizes the texts, based on a predetermined criteria given a constrained resource. The method then transmits the information to a user, as prioritized given the constrained resource.

For example, in one embodiment, a user may have in his or her e-mail box ten or so e-mail messages, including several important e-mail, a few unsolicited, commercial or "junk" e-mail messages, and several e-mail messages with very large attachments. The user may be away from his or her main computer, such that the user must receive e-mail over a pager or cell phone display, or dial in to a text-to-speech system that can read e-mail to the user. Therefore, predetermined criteria in one such embodiment may specify that the junk e-mail is not to be forwarded to the pager, nor the attachments—that is, only the important e-mail and the text of the other e-mail messages (that originally had attachments) are forwarded. The constrained resource in this instance is the fact that the pager does not have a large amount of storage space, and also does not have sufficient bandwidth to receive large amounts of data in a timely manner. Thus, the method outputs the e-mail messages to the user by forwarding them to the pager, given these constrained resources.

Embodiments of the invention include computer-implemented methods, computer-readable media, and computerized systems of varying scope. Still other embodiments, advantages and aspects of the invention will become apparent by reading the following detailed description, and by reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced.

These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Example Computerized Device

Figure 1:
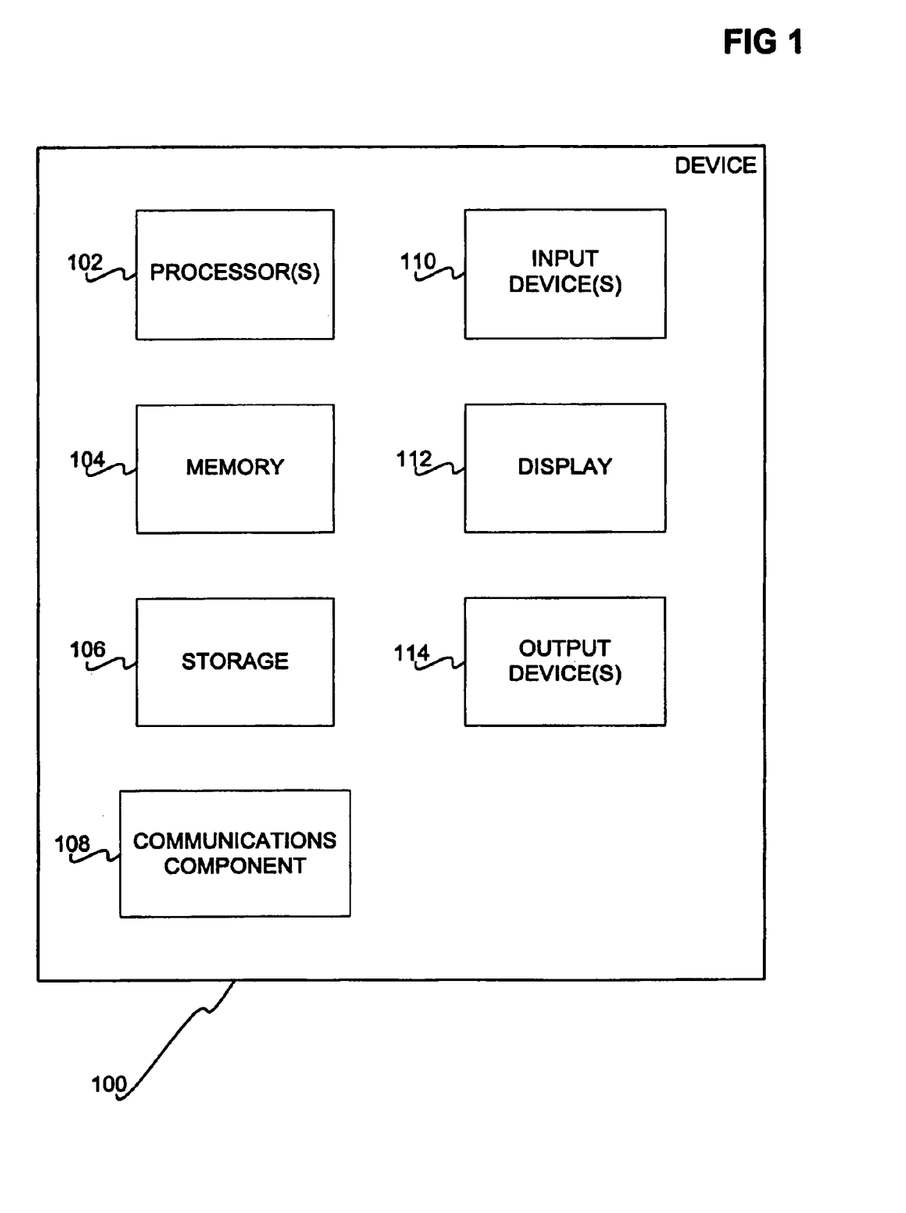
FIG. 1 is a diagram of an example computerized device in conjunction with which embodiments of the invention can be practiced.

Referring to FIG. 1, a diagram of an example computerized device 100 in conjunction with which embodiments of the invention may be practiced is shown. The example computerized device can be, for example, a desktop computer, a laptop computer, a personal digital assistant (PDA), a cell phone, etc.; the invention is not so limited. The description of FIG. 1 is intended to provide a brief, general description of a suitable computerized device in conjunction with which the invention may be implemented. Those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network.

The device 100 includes one or more of the following components: processor(s) 102, memory 104, storage 106, a communications component 108, input device(s) 110, a display 112, and output device(s) 114. It is noted, that for a particular instantiation of the device 100, one or more of these components may not be present. For example, a PDA may not have any output device(s) 114, while a cell phone may not have storage 106, etc. Thus, the description of the device 100 is to be used as an overview as to the types of components that typically reside within such a device 100, and is not meant as a limiting or exhaustive description of such computerized devices.

The processor(s) 102 may include a single central-processing unit (CPU), or a plurality of processing units, commonly referred to as a parallel processing environment. The memory 104 may include read only memory (ROM) 24 and/or random access memory (RAM) 25. The storage 106 may be any type of storage, such as fixed-media storage devices such as hard disk drives, flash or other non-volatile memory, as well as removable-media storage devices, such as tape drives, optical drives like CD-ROM's, floppy disk drives, etc. The storage and their associated computer-readable media provide non-volatile storage of computer-readable instructions, data structures, program modules and other data. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used.

Because the device 100 may operate in a network environment, such as the Internet, intranets, extranets, local-area networks (LAN's), wide-area networks (WAN's), etc., a communications component 108 can be present in or attached to the device 100. Such a component 108 may be one or more of a network card, such as an Ethernet card, an analog modem, a cable modem, a digital subscriber loop (DSL) modem, an Integrated Services Digital Network (ISDN) adapter, etc.; the invention is not so limited. Furthermore, the input device(s) 110 are the mechanisms by which a user indicates input to the device 100. Such device(s) 110 include keyboards, pointing devices, microphones, joysticks, game pads, satellite dishes, scanners, etc. The display 112 is how the device 100 typically shows output to the user, and can include, for example, cathode-ray tube (CRT) display devices, flat-panel display (FPD) display devices, etc. In addition, the device 100 may indicate output to the user via other output device(s) 114, such as speakers, printers, etc.

Representative Operating Environment

In this section of the detailed description, a representative operating environment in conjunction with which embodiments of the invention maybe practiced is described. The environment is described with reference to the diagram of FIG. 2, which is a diagram of a representative environment 199 according to an embodiment of the invention. The invention is not limited to the environment of this section of the detailed description, however.

Figure 2:
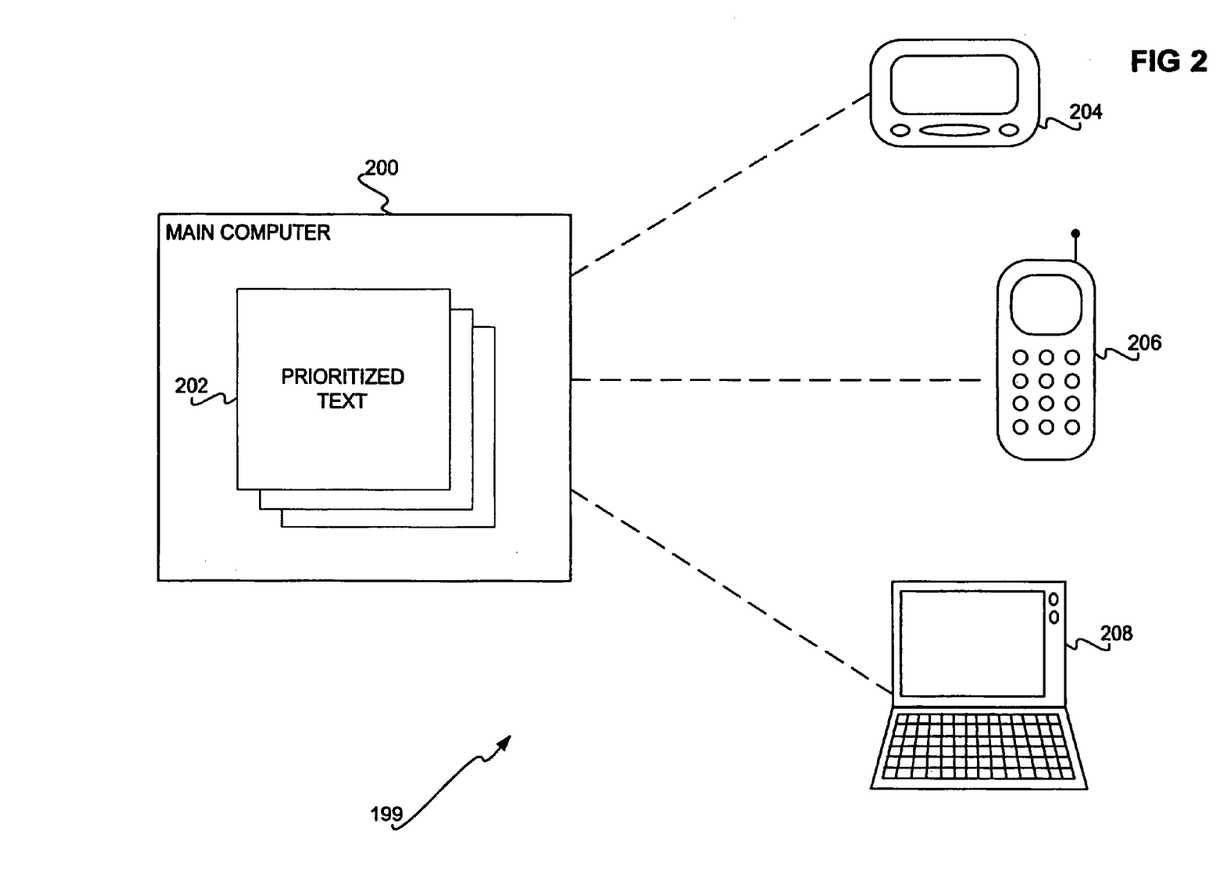
FIG. 2 is a diagram of a representative operating environment in conjunction with which embodiments of the invention may be practiced.

Referring now to FIG. 2, a main computer 200 of a user includes one or more prioritized text 202. The main computer 200 of the user may be, for example, a desktop computer that is located in the user's office or home. The prioritized text 202 may include, for example, a series of e-mail messages that have been received by the main computer 200, and prioritized according to a predetermined criteria, given a constrained resource, as is described in this application.

The environment 199 of FIG. 2 presumes that the user desires to access the prioritized text 202, but not other text that the computer 200 may have received. For example, the user may have received several junk e-mail, several unimportant e-mail that were circulated to the user as well as to all of the user's friends and colleagues, important e-mail that include attachments that are very large, and e-mail from the user's supervisor. In such an instance, the user may desire to read only the e-mail from his or her supervisor, and the text of the important e-mail but not the attachments thereto.

The user, however, may find him or herself in a situation where the user cannot access the text including the prioritized text 202 for a length of time—for example, hours if the user is in a meeting, or even days or weeks if the user is on a business trip or on vacation. Instead, the user desires to have the prioritized text 202 only—that is, not the unimportant messages—forwarded to a pager 204, or a cell phone 206, or may desire to call into the server for the network of which the main computer 202 is a part, or call into the main computer 200 directly, using a modem on a laptop computer 208 to download the text 202. Each of the devices 204, 206 and 208, however, is, has or represents a constrained resource.

For example, the pager 204 typically has meager storage space as compared to the main computer 200, and also typically has limited transmission bandwidth. Therefore, too many messages, or a very large message, may mean that the pager 204 cannot receive all of the user's messages. Furthermore, attempting to upload all the messages to the pager 204 can take an inconveniently long time, because of the limited transmission bandwidth. To this end, the pager 204 is, has or represents a constrained resource. The user, therefore, desires to have only the prioritized text 202 sent to the pager 204, and may also desire that only the first x characters of each message is sent, for example.

With respect to the cell phone 206, the constrained resources are similar. Like the pager 204, the cell phone 206 typically has meager storage space as compared to the main computer 200, and also typically has limited transmission bandwidth. Thus, with respect to the phone 206, the user may only desire to have the prioritized text 202 sent to the cell phone 206, and that only the first x characters of each message sent.

Finally, with respect to the laptop 208, storage space is generally greater than the pager 204 or the cell phone 206; however, other constrained resources are present. Unlike the cell phone 206 and the pager 204, which can receive information unaided by the user, and generally wherever the user happens to be located, the laptop 208, when accompanied by a modem, typically requires the user to actively download information from the computer 200. That is, the user must hook up the laptop 208 to a phone jack, dial the server or the computer 200, and stand by while the prioritized text 202 is downloaded. Furthermore, the modem of the laptop 208 generally also has limited transmission bandwidth, albeit usually better than that of the pager 204 and the phone 206. However, the user may find him or herself, for example, in an airport, where the user only has a limited amount of time to download important messages before having to catch a connecting flight. Therefore, with respect to the laptop computer 208 as well, the user may only desire to have the text 202 sent to the laptop 208, and only the first x characters of each message sent.

Thus, embodiments of the invention provided for prioritization of texts, based on a predetermined criteria, given a constrained resource as has been described. This enables a user to only receive the most important texts at his or her auxiliary device (e.g., the pager 204, the phone 206, or the laptop 208) of all the texts that have been received at the main computer 200 of the user. Those of ordinary skill within the art can appreciate, however, that the invention is not limited to the constrained resources described in this section, and that description in this section of constrained resources is provided only for illustrative purposes as to the types of environments in which embodiments of the invention may be practiced and in which they are useful.

Prioritizing Text Based on a Predetermined Criteria. Given a Constrained Resource In this section of the detailed description, a predetermined criteria is described for prioritizing text, given a constrained resource such as the constrained resources described in the previous section of the detailed description. However, those of ordinary skill within the art can appreciate that the invention is not necessarily limited to the predetermined criteria described in this section.

Methods for downloading content under limited bandwidth and/or intermittent connectivity are now described. The downloading methods center on the creation of classifiers with the ability to recognize the loss of value with time associated with the delayed review of content based on properties of the content. For the example of e-mail, the classifiers take as input a set of features, including the time of day a message is sent, single words, phrases, information about the sender (e.g., someone in a user's address book or someone within some distance in an online organizational tree versus others) and recipient(s) (directly to the user as compared to a user being cc'ed), the length of the body of the message, the presence of one or more questions, and variables representing summaries of statistics about more abstract linguistic features (e.g., presence of future versus past tense, etc.).

Features for discriminating the criticality of content for e-mail include those often seen in low priority messages, including words or patterns of attributes associated with unsolicited or "junk" e-mail in the document such as the quantity and pattern of nonalphanumeric text content such as asterisks and dashes, and quantity of white space. A time-dependent loss function is assigned that captures the loss of value with delayed review of each new document or new item received and uses this value to prioritize the downloading of e-mail content. Note that the methods do not require sophisticated classifiers and are not limited to such. Instead sets of rules can be used to assign and parameterize time-dependent loss functions based on the presence or absence of one or more features associated with new content or messages.

Given a measure of urgency based on features associated with the nature or source of content, a system should download them according to a cost-benefit analysis so that the expected cost associated with delayed review is minimized (or, equivalently, so that the expected value of the transmission is maximized). In a basic approach, each message is fully downloaded according to a cost-benefit analysis. For each item, a cost-benefit ratio is determined, by dividing the value of the transmission by the amount of resources required for transmitting the information. Furthermore, the difference in the value of seeing the message now versus later, per an estimate of the expected time that a message will be reviewed if the message is not relayed now, can be determined as well.

In one approach, the entire message is downloaded, in order of urgency. Downloading is continued until a communications deadline is reached. In another approach, a cost-benefit ratio is utilized. In this approach, the gains in value associated with having the document now versus seeing it later (e.g., during review of e-mail at a time when there is greater bandwidth), divided by the size of the document, are considered. If downloading by this metric, an additional consideration of a single test to check whether the value of any single message is worth more than the total value of messages downloaded by the latter ordering can also be performed. More ideal orderings can be sought by performing local or more general searching over multiple candidate documents for transmission in pursuit of additional savings in value (or, equivalently, the minimization of cost) for any amount of available time or memory.

Furthermore, the value of truncated documents is considered. Rather than downloading entire documents, a function can be employed that truncates a document and that modifies the value of downloading the document—ultimately employing such assignments to download smaller documents that have lesser value. In a basic approach for truncation, large documents can be truncated to a maximum transmitted document size. This value is then used in a cost-benefit analysis. A value function can also be considered over transmitting portions of documents and employing methods that automatically segment and truncate documents in a manner that maximizes returns given multiple truncations dictated by such utility models.

Beyond the use of simple truncation, intelligent summarization of text can be allowed for, as well as options for the user-specified policy of removing attachments or of dynamically removing them given a cost-benefit analysis of the value of the attachments. A user can also be allowed to specify such summarization policies as providing a threshold in value (or urgency), such that documents that have higher value are kept intact, and documents that are below the value are truncated or attachments are removed—or users can be allowed to dictate truncation as a function of the value or urgency of a communication. Other policies include the policy where documents are kept intact, unless they are greater than some size, at which time a value-specific truncation or summarization occurs. A variety of nonlinear or linear functions can be specified for such policies, as can be appreciated by those of ordinary skill within the art.

Furthermore, context can also be considered. This approach considers notions of locality and context and modify urgency scores by the p(message relevant|context). In one approach to context-sensitive caching of information, each document has associated therewith an urgency that is conditioned on the presence of a context (e.g., such as a location and/or time of day). At run-time, the urgencies are assigned to documents based on the context. If context is uncertain, an expected urgency is computed as the mean urgency computed as the average of the urgencies of each document j weighted by the likelihood of each context, $\Sigma_{i=1 \ldots n}$ p(Value j|Context i)p(Context i).

The user's prior knowledge may also be considered. This approach considers the likelihood a user already knows the information in a communicated message (e.g., the likelihood he or she has already heard the information from another source or communication). The expected value of information j changes with changes in the probability, p(User does not know j|E), where E refers to evidence including the time since an incident occurred, a news story broke, how widespread the information is likely to be based on the type of information being transmitted, etc. Typically, this probability decreases with time because the likelihood that a user has received the information from another source increases with time. In the general case, the expected value of information j contained in a message is p(User does not know j|E)*Value (j, j not already known)+[1−p(User does not know j|E)] *Value(j, j already known), where Value(j, j already known) and Value(j, j not already known) refer to the value or urgencies of receiving information j when the information is already known and not known respectively. If Value(j, j already known) is zero, the value of transmitting the information reduces to p(User does not know j|E)*Value(j, j not already known).

Thus, the expected value of transmitting j is diminished by multiplying it with the probability, p(User does not know j|E). More subtle cases of partial knowledge consider the probability that some partial information is available from another source, and that partial value has some value. For example, a high-level summary or rumor may already have been known by a user. For such situations, the probability of the user knowing the high-level information, and the Value (j, high-level summary of j already known) are considered.

Various approaches to prioritizing documents such as e-mail have been described. In general, it is noted that the overall goal is to maximize the utility for the user given information availability constraints—that is, the constrained resources. Put another way, the goal is generally to minimize the expected cost of delayed review of text received at the user's main computer, when the user is away from the computer, and his or her ability to receive the text is hampered by a constrained resource.

Given a series of messages $msg_1 \ldots msg_N$, for text of equal length (for example, as each message is truncated to a length l), a variable i is selected to maximize $$\sum_{i=1}^{N} C(msg_i)$$

where $C(msg_i)$ is the expected cost of delayed review of the text message $msg_i$ received at the user's main computer. This can also be generalized for text of unequal length, as described in the copending and coassigned case entitled "A Technique for Prefetching a Web Page of Potential Future Interest in Lieu of Continuing a Current Information Download," filed on Jan. 15, 1998, and assigned Ser. No. 09/007,894.

Figure 5:
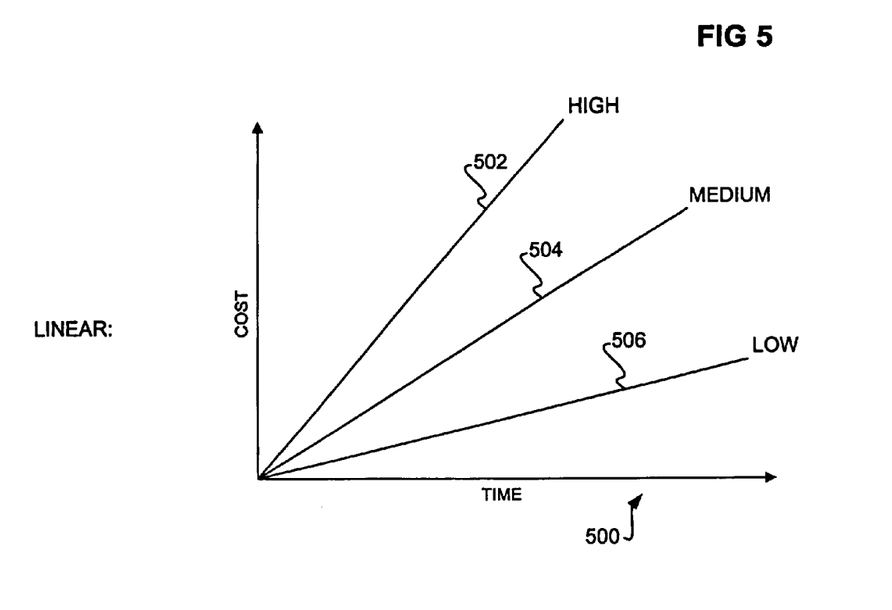
FIG. 5 is a graph showing linear cost functions of high, medium and low priority texts, according to an embodiment of the invention; and, FIG. 6 is a graph showing a non-linear cost function for a text, according to an embodiment of the invention.

This cost function can further vary according to the type of text received. For example, the general case is shown in FIG. 5, which is a graph 500 of linear cost functions dependent on the priority of a text. In the graph 500, as time increases, the cost of not having reviewed a text also increases. However, the cost increases more for a high priority message, as indicated by the line 502, as compared to a medium priority message, as indicated by the line 504, or a low priority message, as indicated by the line 506. That is, the high priority line 502 may have a slope of 100, the medium priority line 504 may have a slope of 10, and the low priority line 502 may have a slope of 1. These slope values can then be used by the text classifier to assist in assigning a priority to a given text, for example, by regression analysis.

Figure 6:
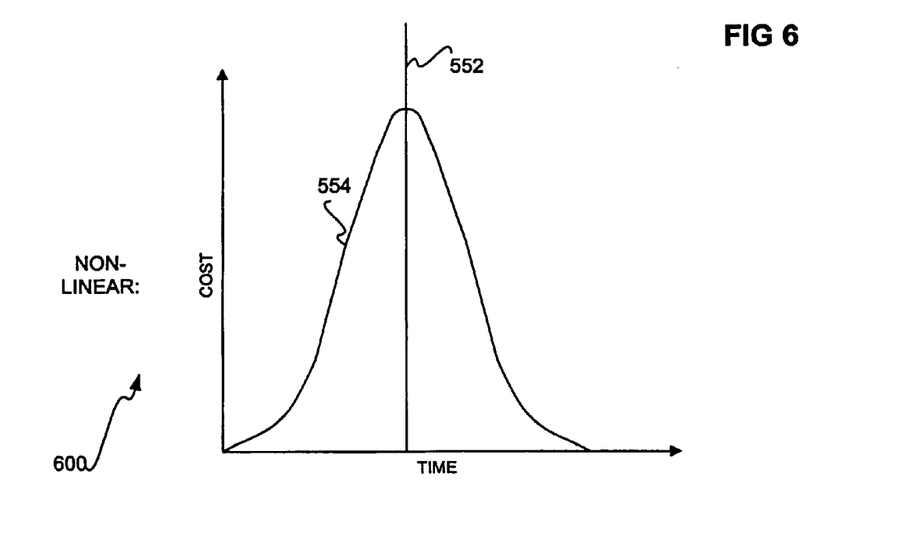

Some messages, however, do not have their priorities well approximated by the use of a linear cost function. For example, a message relating to a meeting will have its cost function increase as the time of the meeting nears, and thereafter, the cost function rapidly decreases—since after the meeting is missed, there is not much generally a user can do about it. This situation is better approximated by a non-linear cost function, as shown in the graph 600 of FIG. 6. In the graph 600, the cost function 554 rapidly increases until it reaches the time of the meeting demarcated by the line 552, after which it rapidly decreases.

In more general representations of the change in value with delayed review of information, general functions for describing the change in cost with delayed review are considered. For example, changes in value can be represented with a sigmoid function. In considering such nonlinear cost functions, a classifier can be employed to learn classes of email, each associated with a single, directly assessed sigmoid curve. In a more detailed approach, classifiers can be employed to learn the parameters describing the height and shape of the sigmoid curve. A set of classifiers can provide a description of such a function including the initial value associated with the importance of an email message, in addition to the temporal dynamics of the loss of value or cost with delayed review.

Thus, those of ordinary skill within the art can appreciate that depending on a message's type, the cost function can be approximated by one of many different representative cost functions, both linear and non-linear.

For a nonlinear function, the cost with delayed review depends on the age of the message. For this more general situation, optimization methods such as dynamic programming and general searching are considered in performing a cost-benefit analysis in ordering messages for transmission under limited bandwidth. In one approximation, the reduction in cost of delay with transmitting each message divided by the size of the transmission is considered. The value of transmitting a message now to a user versus waiting until a later time is identified, such as the time the user will likely see the message when returning from a mobile setting, or a later transmission. A single time, $t_{delay,\ no\ transmit}$, or a probability distribution over the time until a user will see the message if it is not transmitted at the current time, given evidence about the context E, $p(t_{delay,\ no\ transmit}|E)$, where E can represents evidence about the time of day or location of the user, is determined or estimated. The value of transmitting each message is the difference between the value of transmitting the message now and the value when it will likely be seen later. An estimated time delay, $t_{delay,\ transmit}$, that the user will review the message if it is downloaded now, or a probability distribution over this time, $P(t_{delay,\ transmit}|E)$ can additionally be considered.

For the case of a single estimate of times, the gain in value, $\Delta$Value, with transmission of the message is, $$\Delta\text{Value} = \text{Value}(t_{delay,\ transmit}) - \text{Value}(t_{delay,\ no\ transmit})$$

For the case of probability distributions, the expected change in value is, $$\Delta\text{Value} = \text{Integral}_{x=o\ldots}\ p(t_{delay,\ transmit}|E=x)\text{Value}(x)dx - \text{Integral}_{x=o\ldots}\ p(t_{delay,\ no\ transmit}|E=x)\text{Value}(x)dx$$

As in the case of constant urgency, downloading policies is driven now by $\Delta$Value. In one approach the downloading of entire messages is ordered, in order of $\Delta$Value and downloading is continued until a communications deadline is reached. A more ideal downloading policy employs a cost-benefit ratio, where documents are downloaded in the order of the ratio of the $\Delta$Value of each document divided by the size of the document. If downloading by this metric, with the additional consideration of a single test to check whether the value of any single message is worth more than the total value of messages downloaded by the latter ordering, the result will be within a factor of two of optimal for any amount of communication time.

In one embodiment, prioritization of a text based on a predetermined criteria given a constrained resource is accomplished via a text classifier. In such an instance, the predetermined criteria is the manner by which the text classifier is trained, either explicitly, via initial training, or implicitly, via continual training, or both. The text classifier in one embodiment is a Bayesian classifier, as known within the art, while in another embodiment it is a support vector machine (SVM) classifier, as also known within the art.

Text classification methodology based on a Bayesian learning approach is specifically described in the reference M. Sahami, S. Dumais, D. Heckerman, E. Horvitz, A Bayesian Approach to Junk E-Mail Filtering, AAAI Workshop on Text Classification, July 1998, Madison, Wis., AAAI Technical Report WS-98-05. Text classification methodology based on an SVM approach is specifically described in the following references: the coassigned patent, U.S. Pat. No. 5,864,848, issued Jan. 26, 1999; the previously filed and coassigned case entitled "Methods and Apparatus for Building a Support Vector Machine Classifier," Ser. No. 09/055,477, filed on Apr. 6, 1998; and, the reference J. Platt, Fast Training of Support Vector Machines using Sequential Minimal Optimization, MIT Press, Baltimore, Md., 1998. For purposes of this application, specific description is made with reference to an SVM classifier, although those of ordinary skill within the art can appreciate that the invention is not so limited.

Explicit training of a text classifier includes constructing the classifier, including utilizing feature selection. In general, Support Vector Machines build classifiers by identifying a hyperplane that separates a set of positive and negative examples with a maximum margin. In the linear form of SVM that is employed in one embodiment, the margin is defined by the distance of the hyperplane to the nearest positive and negative cases for each class. Maximizing the margin can be expressed as an optimization problem. A post-processing procedure described in the Platt reference is used that employs regularized maximum likelihood fitting to produce estimations of posterior probabilities. The method fits a sigmoid to the score that is output by the SVM classifier.

In the explicit training, the text classifier is presented with both time-critical and non-time-critical texts (e.g., e-mail messages), so that it may be able to discriminate between the two. This training set may be provided by the user, or a standard training set may be used. Given a training corpus, the text classifier first applies feature-selection procedures that attempt to find the most discriminatory features. This process employs a mutual-information analysis. Feature selection can operate on single words or higher-level distinctions made available, such as phrases and parts of speech tagged with natural language processing—that is, the text classifier is able to be seeded with specially tagged text to discriminate features of a text that are considered important. Beyond learning to detect classes of documents or messages with constant urgencies, classes of documents associated with specific nonlinear profiles, e.g., specific sigmoid curves, can be detected. In a more detailed approach, a multilevel approach to classification can be employed to determine first the importance and then different urgencies of messages conditioned on classes of importance—or vice versa. A simplification of such multilevel classification considers separately the development of classifiers for both the initial value of messages and for the urgency of messages. Such conditional or independent classifiers that provide both importance and urgency can be employed at run-time for assessing general functions of the loss of value with delayed review, based on a consideration of both the initial value and the dynamics at which the value changes with delayed review. The case of time-criticality is referred to below but those of ordinary skill within the art are able to understand how classifiers can be used to identify both the initial value and the dynamics describing how value changes with delayed review.

Feature selection for text classification typically performs a search over single words. Beyond the reliance on single words, domain-specific phrases and high-level patterns of features are also made available. Special tokens can also enhance classification. The quality of the learned classifiers for e-mail importance and urgency can be enhanced by inputting to the feature selection procedures handcrafted features that are identified as being useful for distinguishing among e-mail of different importance and time criticality. Thus, during feature selection, single words as well as special phrases and symbols that are useful for discriminating among messages of different levels of time criticality are considered.

Tokens and patterns of value in identifying the importance and time criticality of messages include such distinctions as (including Boolean combinations thereof):

To: Field
Addressed just to user
Addressed to only a few people including user
Addressed to an alias with a small number of people
Addressed to several aliases with a small number of people
Cc:'d to user
Bcc:'d to user People Names on Pre-determined List of Important People
Family members
People at company
Organization chart structure
   Managers I report to
   Managers of managers of people I report to
   People who report to me
External business people Past Tense These Include Descriptions About Events that have Already Occurred Such as:
We met
meeting went
happened
got together
took care of
meeting yesterday Future Tense
Tomorrow
This week
Are you going to
When can we Meeting and Coordination
Get together
Can you meet
Will get together
Coordinate with
Need to get together Resolved Dates Dates Indicated From Text and msg. Time (e.g., Tomorrow, Send Yesterday)

Questions
Sentences Ending In '?'

Indications of Personal Requests:
Can you
Are you
Will you
you please
Can you do Indications of Need:
I need
He needs
She needs
I'd like
It would be great
I want
He wants
She wants
Take care of Time Criticality
happening soon
right away
deadline will be
deadline is as soon as possible
needs this soon
to be done soon
done right away Importance
is important
is critical
Word+!, Word+!!, Word+!?, etc.

Explicit Priority Flag Status (Low, None, High)

General Linguistic Features

Features Describing Structures Identified in Text as Output by a Natural Language Processing (NLP) System, Including Parts of Speech.

Length of Message

Number of Bytes In Component of New Message

Signs of Commercial and Adult-Content Junk E-Mail
Free!!
!!!
Under 18
Adult
Percent caps
Percent nonalphanumenc characters
Characterization of nature and quantity of white space between sentences or paragraphs
Time of day message is received
etc.

Other features that may be used for feature selection are described in the copending and coassigned application entitled "Architecture for Managing Alerts", Ser. No. 09/365,287, filed on Jul. 30, 1999, and in the copending and coassigned application entitled "Methods and Apparatus for Building a Support Vector Machine Classifier," Ser. No. 09/055,477, filed on Apr. 6, 1998. Furthermore, conditioning variables as the context, topic, or target (for routing purposes) of the document can be considered, and separate filters for distinct contexts, topics, or routing targets, associated with the documents can be built.

Furthermore, in one embodiment, the prioritization of text is accomplished as described in the copending and coassigned application entitled "Method for Automatically Assigning Priorities to Documents and Messages," filed on Jul. 30, 1999, and assigned Ser. No. 09/364,527.

Implicit training of the text classifier can be conducted by continually watching the user work. The assumption is that as users work, and lists of mail are reviewed, time-critical messages are read first, and low-priority messages are reviewed later, or just deleted. That is, when presented with a new e-mail, the user is watched to determine whether or not he immediately opens the e-mail, and in what order (if more than one new e-mail are present), deletes the e-mail without opening, and/or replies to the e-mail right away. Thus, the text classifier is such that a user is continually watched while working, and the classifier is continually refined by training in the background and being updated in real time for decision making. For each message inputted into the classifier, a new case for the classifier is created.

Method and System

In this section of the detailed description, a computer-implemented method according to an embodiment of the invention is described, and a computerized system according to an embodiment of the invention is described. With respect to the method, the method is desirably realized at least in part as one or more programs running on a computer—that is, as a program executed from a computer-readable medium such as a memory by a processor of a computer. The program is desirably storable on a machine-readable medium such as a floppy disk or a CD-ROM, for distribution and installation and execution on another computer.

Figure 3:
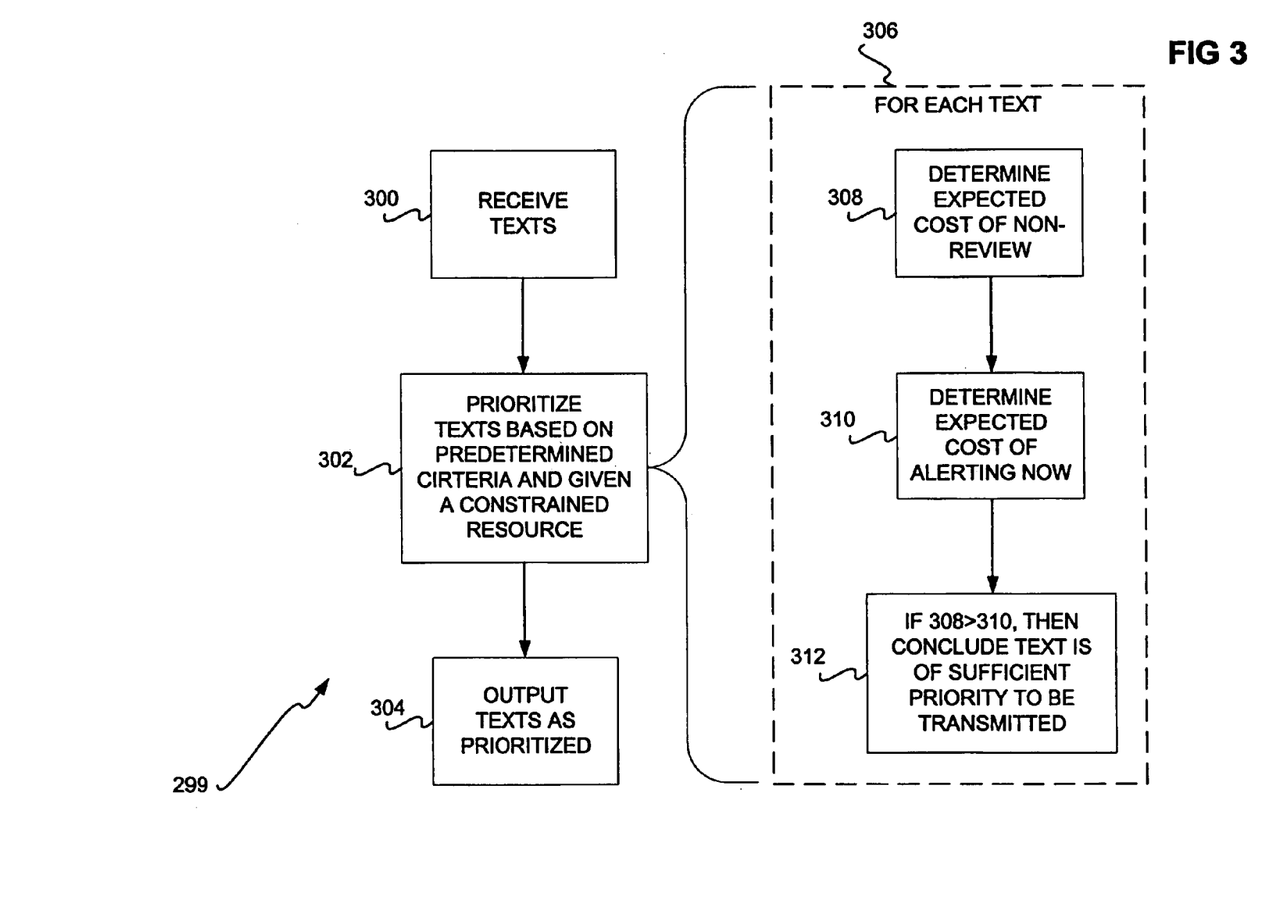
FIG. 3 is a flowchart of a method according to an embodiment of the invention.

Referring to FIG. 3, a flowchart of a method 299 according to an embodiment of the invention is shown. In 300, one or more texts are received. Each text can be an e-mail message, or any other type of text; the invention is not so limited. In 302, the texts are prioritized based on a predetermined criteria, given a constrained resource, as has been described in the previous section of the detailed description. For example, in one embodiment, prioritization is accomplished using a text classifier, such that the manner of training the classifier is the predetermined criteria according to which the prioritization is performed. Thus, in one embodiment, 302 includes initially training and continually training the text classifier, as has been described. Prioritization may also include first truncating each text to a predetermined length, and/or prioritizing the texts based on a maximization of utility of information for the user, given the constrained resource, as has been described. The invention is also not limited to the constrained resource; in one embodiment of the invention, the resource is one or more of: limited bandwidth, limited time to download, and limited memory (storage space), as have been described.

In one embodiment, as particularly indicated by the dotted-line box 306, the prioritization of the texts is accomplished for each text as follows. In 308, the expected loss of non-review of a text, at the current time, is determined, as described in more detail in the previous section of the detailed description. In 310, the expected cost of alerting the user of the text, at the current time, is determined, as has also been described in more detail in the previous section of the detailed description. In 312, if the expected loss of non-review determined in 308 is greater than the expected cost of alerting now determined in 310, then it is concluded that the text is of sufficient priority that the text should be transmitted to the user. Thus, in this embodiment, the texts are divided into two categories: those having priority and which will be transmitted to the user, and those that do not have priority and which will not be transmitted to the user. As can be appreciated by those of ordinary skill within the art, the embodiment of the invention represented by the dotted-line box 306 is not a limitation or a requirement of the invention itself, however.

The priority of the text is then output in 304, as prioritized in 302 given the constrained resource. In one embodiment, this includes transmitting the texts to the user, who is presumed to be away from his main computer at which the texts were received at 300, for example. This may include transmitting the texts to a device such as a cell phone or a pager. Or, this may include a device such as a laptop computer downloading the texts as prioritized (that is, such that the main computer or a server of a network of which the computer is a part uploading the texts to the laptop computer). Again, however, the invention is not so limited.

Figure 4:
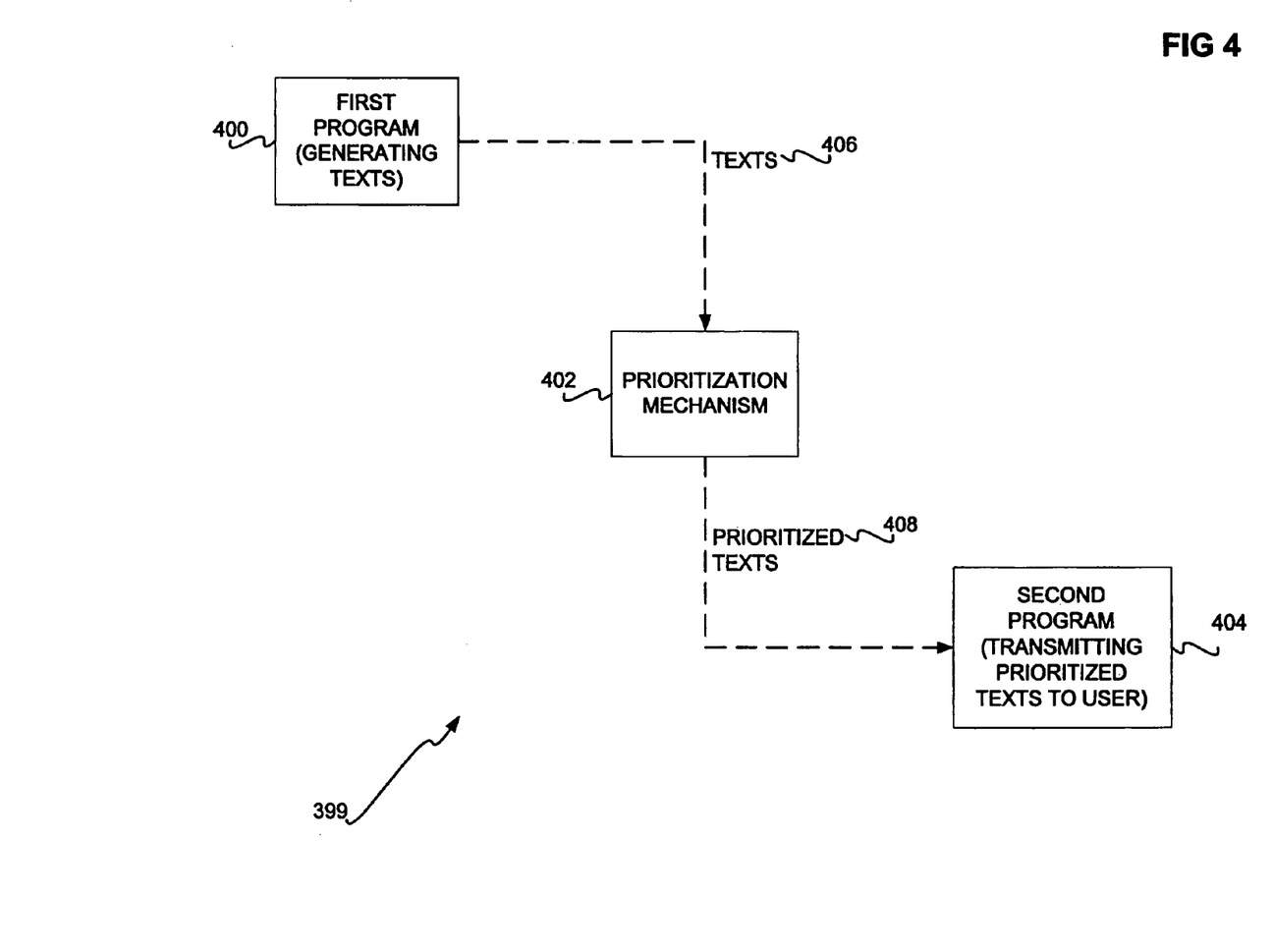
FIG. 4 is a diagram of a system according to an embodiment of the invention.

Referring next to FIG. 4, a diagram of a system according to an embodiment of the invention is shown. The system includes a first program 400, a mechanism 402, and a second program 404. One or more of the programs 400 and 404, and the mechanism 402, include a computer program executed by a processor of a computer from a computer-readable medium thereof, in one embodiment. However, the invention is not so limited.

The first program 400 generates a plurality of texts 406. In one embodiment, the program includes an electronic mail program that receives e-mail, which then serve as the text. The mechanism 402 receives the plurality of text, and prioritizes them based on a predetermined criteria, given a constrained resource, as has been described. The mechanism 402 thus generates the prioritized texts 408. The mechanism 402 in one embodiment may include a text classifier, and may initially truncate each message to a predetermined length, as has also been described. In one embodiment, the prioritization is meant to maximize the utility of information, given the constrained resource (such as: limited bandwidth, limited time, and/or limited memory), as has been described.

The second program 404 receives the prioritized texts 408 from the mechanism 402. For example, the program 404 may be a part of a communications device communicatively coupled to the mechanism 402 in that the program 404 is able to communicate with the mechanism 402, but may not be physically coupled to the mechanism 402. Such devices include a portable computer (e.g., a laptop computer), a handheld computer, a cellular phone, and a pager. However, the invention is not so limited. Thus, the device downloads the plurality of texts 408, as has been prioritized given the constrained resource by the mechanism 402. It is noted that the constrained resource may be inherent within such devices—that is, the nature of a cell phone or a pager, for example, is such that they have constrained resources.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A computer-implemented method comprising:
   receiving a communication that includes electronic text;
   analyzing the electronic text;
   prioritizing the electronic text given a constrained resource based on a predetermined criteria; and transmitting the electronic text as prioritized to a user to mitigate effects of the constrained resource.

2. The method of claim 1, further initially comprising receiving the electronic text.

3. The method of claim 1, prioritizing the electronic text given the constrained resource based on the predetermined criteria comprises utilizing a text classifier to prioritize the electronic text.

4. The method of claim 1, prioritizing the electronic text given the constrained resource based on the predetermined criteria comprises utilizing a user-determined set of rules to prioritize the electronic text.

5. The method of claim 1, prioritizing the electronic text given the constrained resource based on the predetermined criteria comprises utilizing a support vector machine classifier to prioritize the electronic text.

6. The method of claim 1, prioritizing the electronic text given the constrained resource based on the predetermined criteria comprises determining a change in value with delayed review of information contained in each text.

7. The method of claim 1, prioritizing the electronic text given the constrained resource based on the predetermined criteria comprises performing a cost-benefit analysis.

8. The method of claim 1, the constrained resource comprises at least one of: intermittent connectivity; limited bandwidth; and, expensive bandwidth.

9. The method of claim 1, prioritizing the electronic text given the constrained resource based on the predetermined criteria comprises, for each text:
determining an expected loss of non-review of the text at a current time;
determining an expected cost of alerting the user of the text at the current time; and,
upon determining that the expected loss of non-review exceeds the expected cost of alerting the user, concluding that the text should be transmitted to the user.

10. The method of claim 9, determining the expected loss of non-review of each text at the current time considers the expected loss of non-review of the text at a fixture time when the user would otherwise review the text.

11. The method of claim 9, determining the expected loss comprises initially determining a current expected rate of lost opportunity as a function of present time.

12. The method of claim 9, determining the expected cost comprises determining a probability inference as to a likelihood of the user being present.

13. The method of claim 9, determining the expected cost comprises utilizing one of a linear function and a non-linear function.

14. A machine-readable medium having instructions stored thereon for execution by a processor to perform a method for electronic text transmission to a user given a constrained resource, comprising:
receiving a communication that includes electronic text;
analyzing the electronic text;
for each electronic text,
determining an expected loss of non-review of the electronic text at a current time;
determining an expected cost of alerting the user of the electronic text at the current time;
upon determining that the expected loss of non-review exceeds the expected cost of alerting the user, determining that the electronic text should be transmitted to the user; and
transmitting only the electronic text which should be transmitted to the user as determined to reduce an impact of at least one of a limited bandwidth, a limited time to obtain the electronic text, and a limited amount of memory.

15. The medium of claim 14, determining the expected loss of non-review of each text at the current time considers the expected loss of non-review of the text at a future time when the user would otherwise review the text.

16. The medium of claim 14, determining the expected loss comprises initially determining a current expected rate of lost opportunity as a function of present time.

17. The medium of claim 14, determining the expected cost comprises determining a probability inference as to a likelihood of the user being present.

18. The medium of claim 14, determining the expected cost comprises utilizing one of a linear function and a non-linear function.

19. A computerized system comprising:
a component that receives electronic text;
a prioritization mechanism that prioritizes the electronic text, given a constrained resource, based on a predetermined criteria; and
a device that transmits the electronic text as prioritized by the prioritization mechanism to reduce an impact associated with the constrained resource.

20. The system of claim 19, further comprising a program that generates the electronic text.

21. The system of claim 19, the constrained resource is inherent within the device.

22. A computer-based system, comprising:
a statistical classifier that prioritizes, based at least in part upon predetermined criteria, a computer readable item given a constrained resource; and
a component that transmits and/or receives the computer readable item as prioritized to mitigate a cost associated with the constrained resource.

23. The system of claim 22 applies a value density analysis in connection with handling the item.

24. The system of claim 22, the component transmits the item as a function of ratio of urgency of the item and size thereof.

25. The system of claim 22, the statistical classifier performs a probabilistic-based analysis on the item.

26. The system of claim 22 downloads the item as a function of loss of value of time associated with delayed review of content of the item.

27. The system of claim 22, the classifier employs as input features, at least one of: time of day the item was sent, single words, phrases, sender information, size of the item, length of the item, linguistic features associated with the item.

28. The system of claim 22, the classifier factors features associated with unsolicited messages.

29. The system of claim 22, further comprising a component that performs a utility-based analysis in connection with the item.

30. The system of claim 29, the utility-based analysis is based at least in part on value of transmitting the item versus amount of resources required to transmit the item.

31. The system of claim 29, the utility-based analysis is based at least in part on a value associated with truncating the item.

32. The system of claim 31, the classifier setting a threshold value wherein item(s) that fall below the threshold are truncated, and items above the threshold are kept intact.

33. The system of claim 29, the utility-based analysis is based at least in part on value of presently transmitting the item and the value associated with when the item will be received and/or reviewed.

34. The system of claim 33, the utility-based analysis is based at least in part on a probability distribution corresponding to the time delay.

35. A computer-based system, comprising:
- means for prioritizing computer readable item given a constrained resource and predetermined criteria for prioritization; and
- means for transmitting and/or obtaining the computer readable item as prioritized to mitigate an effect of the constrained resource.

36. The system of claim 35, further comprising means for applying a value density analysis in connection with handling the item.

37. The system of claim 35, the means for transmitting transmits the item as a function of ratio of urgency of the item and size thereof.

38. The system of claim 35, further comprising means for downloading the item as a function of loss of value of time associated with delayed review of content of the item.

39. The system of claim 35, further comprising means for performing a utility-based analysis in connection with the item, the utility-based analysis is based at least in part on value of transmitting the item versus amount of resources required to transmit the item.

40. The system of claim 39, the utility-based analysis is based at least in pan on a value associated with truncating the item.

41. A computer-based methodology, comprising:
- prioritizing electronic item(s), based at least in part upon respective urgency of the electronic item(s) and respective size thereof; and
- transmitting and/or obtaining the electronic item(s) as prioritized to reduce an effect of at least one of a limited bandwidth, a limited time to transfer the electronic item(s), and a limited amount of memory.

* * * * *